Patented May 9, 1939

2,157,386

UNITED STATES PATENT OFFICE 2,157,386

HYDROGENATION OF NITROHYDROXY COMPOUNDS

Kenneth Johnson, Terre Haute, Ind., assignor to Purdue Research Foundation, La Fayette, Ind., a corporation of Indiana No Drawing. Application August 19, 1937, Serial No. 159,869

11 Claims. (Cl. 260—584)

My invention relates to the production of amino-compounds by the hydrogenation of nitrohydroxy compounds, and is especially applicable to the production of aliphatic aminoalcohols and aliphatic aminoglycols by the catalytic hydrogenation of the corresponding nitro compounds.

The aliphatic nitrohydroxy compounds are at present readily available and may be prepared according to any of the known methods. The aliphatic nitroalcohols and nitroglycols are most suitably prepared by the method of copending application Serial No. 146,855 by B. M. Vanderbilt, filed June 7, 1937, which comprises reacting a primary or secondary nitroparaffin with aldehydes under suitably controlled conditions in the presence of a common solvent, such as ethyl alcohol, and in the presence of an alkaline catalyst such as sodium hydroxide, the aldehyde being slowly added to a solution of the nitroparaffin and catalyst in the auxiliary solvent while thoroughly agitating. I have now discovered an improved process for the direct hydrogenation of these and other similar types of nitrohydroxy compounds to produce amino compounds.

The nitrohydroxy compounds which are suitable for my process constitute the hydroxynitroparaffins and the aryl or cyclo-alkyl substituted hydroxynitroparaffins, or mixtures thereof. Among the hydroxynitroparaffins, the nitroalcohols such as 2-nitro-1-butanol, 2-nitro-1-pentanol, 2-nitro-3-hexanol, 3-nitro-4-heptanol, and 5-nitro-4-octanol, and the nitroglycols such as 2-methyl-2-nitro-1,3-propanediol, 2-ethyl-2-nitro-1,3-propanediol, and 2-isopropyl-2-nitro-1,3-propanediol, may, for example, be utilized. My invention is not to be limited to any particular hydroxynitroparaffins of this series, however, but may be applied to any aliphatic hydroxynitrohydrocarbon. This term, as used herein and in the appended claims, signifies any hydroxynitrohydrocarbon containing an aliphatic grouping with the nitro and hydroxy groups attached thereto.

According to my process the hydroxynitro compounds are hydrogenated in the liquid phase in the presence of a catalyst and at temperatures below 165° C. The pressure and temperature relationships may be varied for the hydrogenation depending upon the particular hydroxynitro compound being hydrogenated and the catalyst that is used in the process. I have employed pressures from atmospheric to 2,000 pounds per square inch. In general, higher pressures require less time for complete hydrogenation to occur.

The reaction temperature should be maintained below 165° C., and preferably below 150° C. High temperatures, in general, favor a more rapid hydrogenation, but I have found that at temperatures substantially above 165° C. there is a pronounced tendency for decomposition to occur with liberation of ammonia.

Although operation below a temperature of 165° C. will insure high yields of amino compounds, I have found that at elevated temperatures even within this range considerable amounts of lower amino compounds especially alkylamines are formed, in addition to the aminohydroxy compound corresponding to the nitrohydroxy compound being reduced. I have discovered, however, that the formation of these lower amino compounds may be very substantially diminished by operating at a temperature below approximately 60° C., and preferably within the range 15° C.–50° C. Under these circumstances, yields of the corresponding hydroxyamino compound of the order of 70% are readily obtainable.

The hydrogenation reaction effected in my process is exothermic, and when high pressures are employed the heat of reaction will cause the temperature to rise to some extent, often sufficient to require cooling to maintain a temperature within the preferred range. The time required for complete hydrogenation to occur in my process is a function of the temperature and pressure; that is, higher temperature and pressure will give rise to more rapid hydrogenation.

I have found, in general, that any suitable hydrogenation catalyst that is active at the desired operating temperature may be used in my process. A number of such hydrogenation catalysts are described in the Hydrogenation of Organic Substances, Third Edition, 1930, by Carleton Ellis. I prefer to use a finely divided nickel catalyst that is prepared in the following manner: A nickel-aluminum alloy is prepared in finely divided form. A suitable alloy contains 50% aluminum and 50% nickel. The aluminum is dissolved out of the powdered alloy by strong alkali solution. The nickel residue is washed free from alkali and salts with water and kept under liquid. This catalyst is active at temperatures around 25° C. and may be used repeatedly without losing its activity. However, I have found that numerous other catalysts are also satisfactory. Nickel, precipitated from nickel carbonate and supported on infusorial earth (Covert et al., Jour. Amer. Chem. Soc. 54, 1651 (1932)), or nickel-silica gel catalysts (Holmes and Anderson, Ind. & Eng. Chem. 17, 280 (1925)), may also be employed. These catalysts are most active at temperatures above about 83° C., however, and are less desirable for hydrogenations at the lower temperatures. Adkins copper chromite (Adkins and Conner, Jour. Amer. Chem. Soc. 53, 1091 (1931)), copper silica gel (Holmes and Anderson, loc. cit.), and nickel formate (Ellis, loc. cit. page 145) may also be used but the optimum temperature for the hydrogenation using these catalysts is generally above 125°, and consequently the use of these catalysts is less advantageous because of this limitation. It is preferable, in general, to utilize catalysts that are active at lower temperatures because of the tendency for production of amines and decomposition with liberation of ammonia to occur at elevated temperatures.

The hydrogenation may be effected without the use of any auxiliary solvent, but the nitrohydroxy compounds and, especially the nitroglycols, are quite viscous, and in the absence of an auxiliary solvent the catalyst tends to agglomerate and thus to become substantially less effective. I therefore prefer to dissolve the nitro compounds in a solvent such as anhydrous or aqueous methyl or ethyl alcohol before hydrogenation. Any suitable solvent or solvent mixture may be used in my process which is chemically inert toward the catalyst and the components of the reaction mixture at the temperature employed. The nature of the solvent which will secure optimum results will, of course, depend to some extent upon the reaction conditions employed. Thus, I prefer to employ a more dilute aqueous alcohol for hydrogenation at atmospheric pressure than at the increased pressures. The relative proportion of nitrohydroxy compound and the solvent will also depend to some extent upon the particular materials involved and the other reaction conditions. I have found that if it is desired to operate at an extremely low temperature the reaction is more readily initiated if the concentration of nitrohydroxy compound in the solvent is relatively low. The yields of the corresponding amino-hydroxy compounds also tend to be higher when operating with relatively dilute solutions of the nitrohydroxy compounds. In general, I prefer to employ a solution having a concentration of nitrohydroxy compound of the order of 25%, but it is to be understood that my process may be carried out in any practical concentration and even in the absence of solvent. In any particular case preliminary experiments will readily demonstrate the optimum composition of the reaction mixture.

In general, superatmospheric pressure hydrogenations may be carried out in the following manner: The nitrohydroxy compound and catalyst, preferably together with a solvent, are introduced into a suitable pressure hydrogenation apparatus and sealed. Such an apparatus may be of the Adkins type which comprises a cylindrical steel reaction vessel fitted with flexible tubing for the introduction of hydrogen gas under pressure. The apparatus is preferably kept in motion during the hydrogenation in order to insure thorough mixing of the nitrohydroxy compound, the hydrogen, and the catalyst. The reaction vessel may be wrapped with an electrical heating coil and cooling means may also be provided in order that the hydrogenation may be carried out at the desired temperature. After the hydrogenation is complete, the reaction mixture is removed from the apparatus, and the resulting amino compounds may be separated by any suitable method such as distillation or crystallization of the acid salts.

The following specific examples are given in order to illustrate this procedure:

Example I

A mixture of 59.5 parts by weight of 2-nitro-1-butanol, 7.5 parts of nickel catalyst, prepared as described above, and 137 parts of 95% ethyl alcohol was introduced into an Adkins type hydrogenation apparatus. Hydrogen was introduced and maintained at a pressure of 600 pounds for 8 hours and the temperature was maintained at 25° C.–30° C. Conversion of the nitrobutanol to amino compounds was over 92%, and conversion to 2-amino-1-butanol was 74.5%.

Example II

A mixture of 100 parts by weight of 2-nitro-2-ethyl-1,3-propanediol, 7.5 parts of nickel catalyst, and 246 parts of 90% methyl alcohol was introduced into the hydrogenation apparatus, and hydrogen was then introduced and maintained at a pressure of about 300 pounds per square inch until no further temperature rise was indicated. During this period the temperature rose from approximately 25° C. to approximately 40° C. At the conclusion of the exothermic reaction the hydrogen pressure was increased to 1,000 pounds per square inch and the temperature was raised to 50° C. and maintained at this point for 1 hour. Conversion of the nitroglycol to amino compounds was over 94%, and to the corresponding 2-amino-2-ethyl-1,3-propanediol was 72%.

Example III

A mixture of 33 parts by weight of 2-methyl-2-nitro-1,3-propanediol, 3 parts of nickel catalyst, and 137 parts of 95% ethyl alcohol was introduced into the hydrogenation apparatus. Hydrogen was then introduced and maintained at a pressure of 1,200 pounds per square inch for 1 hour while maintaining the temperature at approximately 100° C. Conversion to amino compounds was over 89%.

The above examples are merely descriptions of procedures that are included within the scope of my invention and do not limit it in any manner. For example, my invention is not to be limited to the type of apparatus in which the hydrogenation may be carried out. Any type of equipment suitable for atmospheric or superatmospheric pressure hydrogenation may be employed. I may, for example, carry out my process in an apparatus that is designed for continuous rather than intermittent operation.

My invention is applicable to the hydrogenation of any aliphatic hydroxynitrohydrocarbon carried out in the liquid phase below 165° C. The higher nitrohydroxy compounds which are solid at ordinary temperatures may be hydrogenated at temperatures above their respective melting points, or they may be dissolved or emulsified in suitable materials in order to be hydrogenated. Optimum conditions such as temperature, hydrogen pressure, solvent and catalyst may be determined experimentally for any particular nitrohydroxy compound to be treated, and any such variations are included within the scope of my invention.

What I claim is:

1. In a catalytic process for the direct hydrogenation of aliphatic hydroxynitrohydrocarbons to amino compounds, the improvement which comprises effecting the reaction in the liquid phase at a temperature from about 15° C. to about 165° C.

2. In a catalytic process for the direct hydrogenation of aliphatic hydroxynitrohydrocarbons to amino compounds, the improvement which comprises effecting the reaction in the liquid phase at a temperature from 15° C. to 150° C.

3. In a catalytic process for the direct hydrogenation of aliphatic hydroxynitrohydrocarbons to amino compounds, the improvement which comprises effecting the reaction in the liquid phase in the presence of an inert solvent for the hydroxynitrohydrocarbon at superatmospheric pressure and at a temperature from 15° C. to 150° C.

4. In a catalytic process for the direct hydrogenation of nitroalcohols to amino compounds, the improvement which comprises effecting the reaction in the liquid phase in the presence of a nickel hydrogenation catalyst and an inert solvent for the nitroalcohol at superatmospheric pressure and at a temperature from 15° C. to 150° C.

5. In a catalytic process for the direct hydrogenation of nitroglycols to amino compounds, the improvement which comprises effecting the reaction in the liquid phase in the presence of a nickel hydrogenation catalyst and an inert solvent for the nitroglycol at superatmospheric pressure and at a temperature from 15° C. to 150° C.

6. In a catalytic process for the direct hydrogenation of aliphatic hydroxynitrohydrocarbons to the corresponding hydroxyaminohydrocarbons, the improvement which comprises effecting the reaction in the liquid phase at a temperature from about 15° C. to about 60° C.

7. In a catalytic process for the direct hydrogenation of aliphatic hydroxynitrohydrocarbons to the corresponding hydroxyaminohydrocarbons, the improvement which comprises effecting the reaction in the liquid phase at a temperature from 15° C. to 50° C.

8. In a catalytic process for the direct hydrogenation of aliphatic hydroxynitrohydrocarbons to the corresponding hydroxyaminohydrocarbons, the improvement which comprises effecting the reaction in the liquid phase in the presence of an inert solvent for the hydroxynitrohydrocarbon at superatmospheric pressure and at a temperature from 15° C. to 50° C.

9. In a catalytic process for the direct hydrogenation of nitroalcohols to the corresponding aminoalcohols, the improvement which comprises effecting the reaction in the liquid phase in the presence of a nickel hydrogenation catalyst and an inert solvent for the nitroalcohol at superatmospheric pressure and at a temperature from 15° C. to 50° C.

10. In a catalytic process for the direct hydrogenation of nitroglycols to the corresponding aminoglycols, the improvement which comprises effecting the reaction in the liquid phase in the presence of a nickel hydrogenation catalyst and an inert solvent for the nitroglycol at superatmospheric pressure and at a temperature from 15° C. to 50° C.

11. In a catalytic process for the direct hydrogenation of aliphatic hydroxynitrohydrocarbons to the corresponding hydroxyaminohydrocarbons, the improvement which comprises effecting the reaction in the liquid phase in the presence of an inert solvent for the hydroxynitrohydrocarbon at superatmospheric pressure from atmospheric pressure to 2000 lbs. per sq. in. and at a temperature from about 15° C. to about 165° C.

KENNETH JOHNSON.